(12) United States Patent
Simonetto et al.

(10) Patent No.: US 11,886,319 B2
(45) Date of Patent: Jan. 30, 2024

(54) METHODS AND SYSTEMS FOR MANAGING AS-A-SERVICE SYSTEMS IN THE EVENT OF CONNECTIVITY ISSUES

(71) Applicants: INTERNATIONAL BUSINESS MACHINES CORPORATION, Armonk, NY (US); Universita degli Studi di Padova, Padua (IT)

(72) Inventors: Andrea Simonetto, Tours (FR); Nicola Bastianello, Padua (IT); Ruggero Carli, Padua (IT); Tigran Tigran Tchrakian, Castleknock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 17/647,693

(22) Filed: Jan. 11, 2022

(65) Prior Publication Data

US 2023/0222047 A1   Jul. 13, 2023

(51) Int. Cl.
*G06F 9/44*      (2018.01)
*G06F 11/34*     (2006.01)

(52) U.S. Cl.
CPC ...... *G06F 11/3495* (2013.01); *G06F 11/3409* (2013.01)

(58) Field of Classification Search
CPC .................................................. G06F 11/3495
USPC ............................................................ 719/320
See application file for complete search history.

(56) References Cited

U.S. PATENT DOCUMENTS

| 10,027,753 B2 | 7/2018 | Arcas et al. |
| 10,067,652 B2 | 9/2018 | Kleinpeter et al. |
| 2019/0028561 A1* | 1/2019 | Freedman ........... H04L 61/4511 |
| 2019/0334993 A1 | 10/2019 | Gkoufas et al. |

* cited by examiner

*Primary Examiner* — Timothy A Mudrick
(74) *Attorney, Agent, or Firm* — GRIFFITHS & SEATON PLLC (57) ABSTRACT

Embodiments for managing an as-a-service (aaS) computing system by a processor are provided. Input provided by at least one computing device to a cloud platform is monitored. Output provided by the cloud platform to the at least one computing device in response to the input provided by the at least one computing device is monitored. At least one local model is generated based on the input provided to the cloud platform and the output provided to the at least one computing device.

18 Claims, 6 Drawing Sheets

METHODS AND SYSTEMS FOR MANAGING AS-A-SERVICE SYSTEMS IN THE EVENT OF CONNECTIVITY ISSUES

BACKGROUND OF THE INVENTION

Field of the Invention

The present invention relates in general to computing systems, and more particularly, to various embodiments for managing as-a-service (aaS) systems.

Description of the Related Art

As-a-service (aaS) (or anything as-a-service (XaaS)) generally refers to the providing of various resources, services, tools, technologies, etc. in a computing environment in which at least some of the required resources are remotely located and the services (or other products) are delivered to users (and/or computing devices thereof) over a network, such as the Internet, the "cloud," etc. Such is in contrast to conventional environments in which the necessary resources (e.g., servers, etc.) are on-site and/or local to the users. The types of services provided via aaS systems may range from access to software or other computing resources to the control of devices, such as robots or other machines.

Current systems that utilize aaS platforms often experience, for example, intermittent connectivity, denial-of-service, and high latency, hindering results and the availability of real-time "decisions" (or other response or output from aaS platforms). As such, the may not be appropriate to use in critical applications where safety is a concern unless a local back-up, which is often an expensive and relatively slow copy of the aaS platform is available, given that they can not guarantee real-time decisions. Additionally, such systems can not guarantee equal performance and robustness in the case of intermittent connectivity, especially when the decisions made on the as-a-Service platform depend on data streams related to different users, as a local copy can not mimic the as-a-Service platform.

SUMMARY OF THE INVENTION

Various embodiments for managing an as-a-service (aaS) computing system, by a processor, are provided. Input provided by at least one computing device to a cloud platform is monitored. Output provided by the cloud platform to the at least one computing device in response to the input provided by the at least one computing device is monitored. At least one local model is generated based on the input provided to the cloud platform and the output provided to the at least one computing device.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, as-a-service (aaS) (or anything as-a-service (XaaS)) generally refers to the providing of various resources, services, tools, technologies, etc. in a computing environment in which at least some of the required resources are remotely located and the services (or other products) are delivered to users (and/or computing devices thereof) over a network, such as the Internet, over the "cloud," etc. Such is in contrast to conventional environments in which the necessary resources (e.g., servers, etc.) are on-site and/or local to the users. The types of services provided via aaS systems may range from access to software or other computing resources to the control of devices, such as robots or other machines.

Current systems that utilize aaS platforms often experience, for example, intermittent connectivity, denial-of-service, and high latency, hindering results and the availability of real-time "decisions" (i.e., a type of response or output from aaS platforms). As such, the may not be appropriate to use in critical applications where safety is a concern unless a local back-up, which is often an expensive and relatively slow copy of the aaS platform, is available, given that they can not guarantee real-time decisions. Additionally, such systems can not guarantee equal performance and robustness in the case of intermittent connectivity, especially when the decisions made on the as-a-Service platform depend on data streams related to different users, as a local copy can not mimic the aaS platform.

As such, in current systems, connectivity issues are typically dealt with using relatively slow, local copies of the aaS platform and/or cheap, local "a-priori" models. Local copies of aaS platforms typically can not guarantee robustness, safety, or real-time operations. Cheap a-priori models can not accommodate large variations in service applications or distributed decision making. An example of such may be a Global Positioning Satellite (GPS) navigation application that uses the last recorded velocity to determine current position when in a tunnel but does not use other sensor data to learn a more comprehensive dynamical model that may be mandatory in critical scenarios in which safety is a concern. Additionally, local copies are typically static and pertain only the single users despite the increased prominence of spatially distributed decision making.

Thus, generally, current approaches can not guarantee robustness, safety, or real-time operations. Additionally, current solutions can not include (or utilize) spatially-distributed decisions.

To address these needs and/or the shortcomings in the prior art, in some embodiments described herein, methods and/or systems are disclosed that, for example, provide robust, safe, and real-time operations when (as an example) connectivity issues arise in aaS settings (or environments, platforms, systems, etc.) or perhaps more generally any situation in which remote or cloud computing is involved.

In some embodiments, methods and/or systems are provided that monitor data (or input) sent to an aaS platform (or other remote computing system(s)/device(s), the cloud, etc.) and data streams (or output) sent back to the user (and/or associated computing device). The input and output is utilized to lean or generate one or more local models (or local input-output models). As one example, a local surrogate may be generated based on the input-output data. More particularly, in some embodiments, the local model(s) include a cheap, local surrogate (CLS). As will be appreciated by one skilled in the art, "cheap" may refer to the model(s) being computationally "light" (e.g., the model can run/process quickly and/or doesn't require significant computational capabilities/resources, at least when compared to the calculations, models, etc. utilized by the aaS platform).

In some embodiments, a transfer learning component is provided which allows for the local model(s) to be generated (or trained, learned, updated, etc.) based on data (e.g., input-output data) of other users of the aaS platform (or other computing devices interacting with the aaS platform). For example, this data may be utilized to train generate the CLS. However, in some embodiments, a local model is dynamically learned (or generated) based on this data associated with other users. As an example, this (second) model may be an artificial intelligence (AI) or machine learning (ML) model (e.g., a cheap, local AI model (CLAI) that mimics the input-output data from other users (e.g., if important in the decision making process).

In some embodiments, a component is included or utilized that monitors for connectivity issues with the aaS platform, and when/if such issues are detected, switches between the aaS platform to the local model(s) to perform any required functionality (e.g., decision making). That is, in some embodiments described herein, if a connectivity issue with the aaS is detected, the systems (and/or methods) switch to utilizing one or more models that have been generated based on, for example, input-output data associated with the aaS platform, which are implemented (or stored) locally (e.g., local to the user/device utilizing the aaS platform, such as within/on the same computing device, processor, memory, etc.).

It should be understood that at least some of the aspects of functionality described herein may be performed utilizing a cognitive analysis (or AI, ML, etc.). The cognitive analysis may include natural language processing (NLP) and/or natural language understanding (NLU) or NLP/NLU technique, such classifying natural language, analyzing tone, and analyzing sentiment (e.g., scanning for keywords, key phrases, etc.) with respect to, for example, content (e.g., of a corpus) and communications sent to and/or received by users or entities and/or other available data sources. In some embodiments, Mel-frequency cepstral coefficients (MFCCs) (e.g., for audio content), and/or region-based convolutional neural network (R-CNN) pixel mapping (e.g., for object detection/classification and facial recognition in images/videos), as are commonly understood, are used.

The processes described herein may utilize various information or data sources associated with users, entities, computing devices/nodes, and/or the content of documents. The data sources may include any available information (or data) sources. For example, in some embodiments, a profile (e.g., a cognitive profile) for the user(s) (and/or entities) may be generated. Data sources that may be use used to generate cognitive profiles may include any appropriate data sources associated with the user/entity that are accessible by the system (perhaps with the permission or authorization of the user/entity). Examples of such data sources include, but are not limited to, input provided to an aaS platform and output received from an aaS platform. However, other data sources may also be utilized, such as communication sessions and/or the content (or communications) thereof (e.g., phone calls, video calls, text messaging, emails, in person/face-to-face conversations, etc.), a profile of (or basic information about) the user/entity (e.g., demographic information, job title, place of work, length of time at current position, family role, etc.), a schedule or calendar (i.e., the items listed thereon, time frames, etc.), projects (e.g., past, current, or future work-related projects, "to-do" lists, etc.), location (e.g., previous and/or current location and/or location relative to other users), social media activity (e.g., posts, reactions, comments, groups, etc.), browsing history (e.g., web pages visited), and online purchases. The cognitive profile(s) may be utilized to, for example, tailor the feedback to the individual user(s).

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, manage aaS (or cloud) platforms or systems, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, a robot, etc. and/or an application, such a chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing an as-a-service (aaS) computing system, by a processor, is provided. Input provided by at least one computing device to a cloud platform is monitored. Output provided by the cloud platform to the at least one computing device in response to the input provided by the at least one computing device is monitored. At least one local model is generated based on the input provided to the cloud platform and the output provided to the at least one computing device.

A connectivity issue associated with the cloud platform may be detected. Subsequent input provided by the at least one computing device to the cloud platform may be monitored. Local output for the at least one computing device may be generated based on the subsequent input provided by the at least one computing device and the at least one local model.

Each of the output provided by the cloud platform and the local output generated based on the at least one local model may include at least one decision associated with an action to be performed by the at least one computing device. The generating of the local output for the at least one computing device may be computationally cheaper than said providing of the output by the cloud platform.

The at least one local model includes at least one of a surrogate model and an artificial intelligence (AI) model. The cloud platform may include at least one of a single cloud platform, a multiple cloud platform, and a hybrid cloud platform.

The at least one computing device may include a plurality of computing devices, and the at least one local model may include a first local model and a second local model. The first local model may be local to a first of the plurality of computing devices and generated based on the input provided by the first of the plurality of computing devices to the cloud platform and the output provided by the cloud platform to the first of the plurality of computing devices. The second local model may be local to the first of the plurality of computing devices and generated based on the input provided by others of the plurality of computing devices to the cloud platform and the output provided by the cloud platform to the others of the plurality of computing devices.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
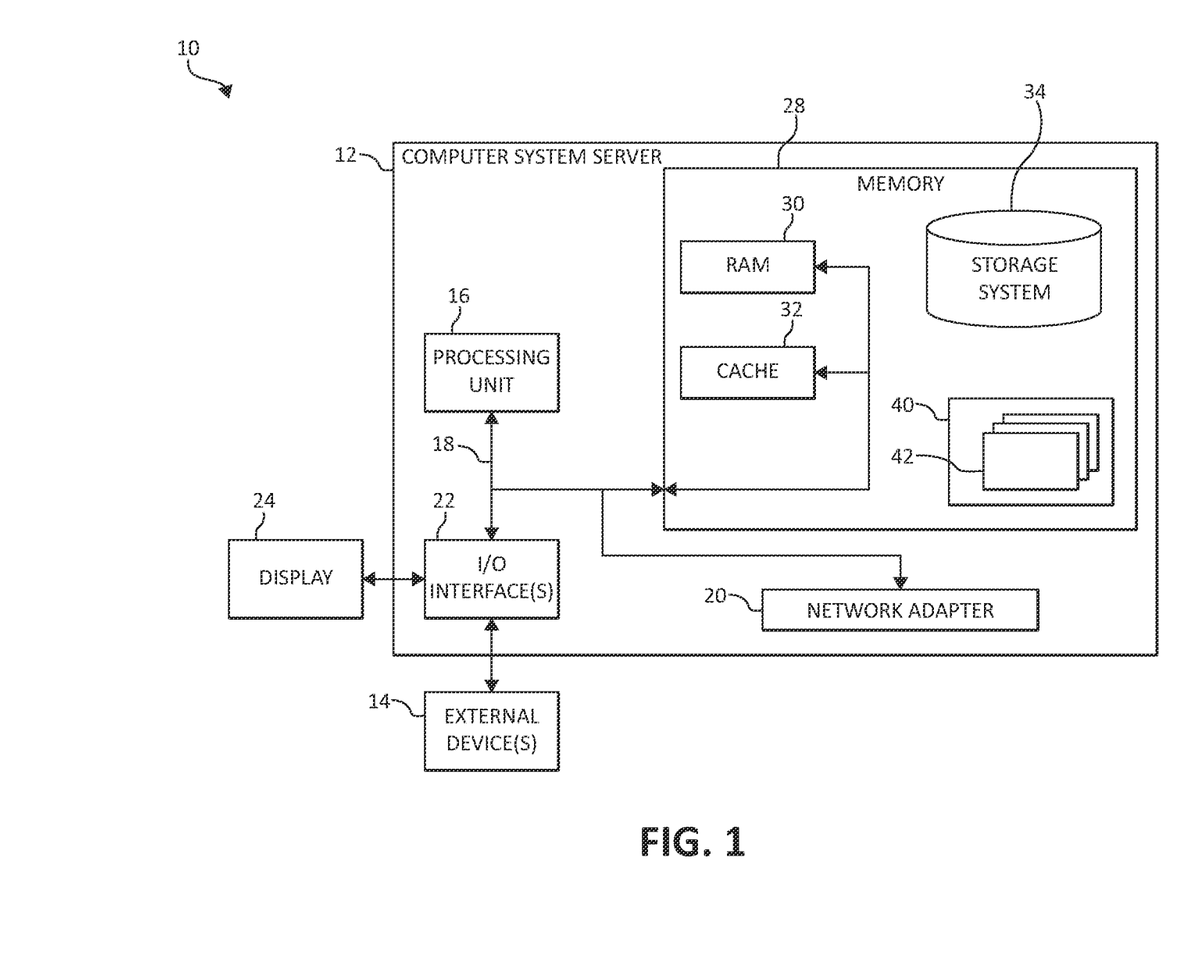
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in (and/or integrated into) vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
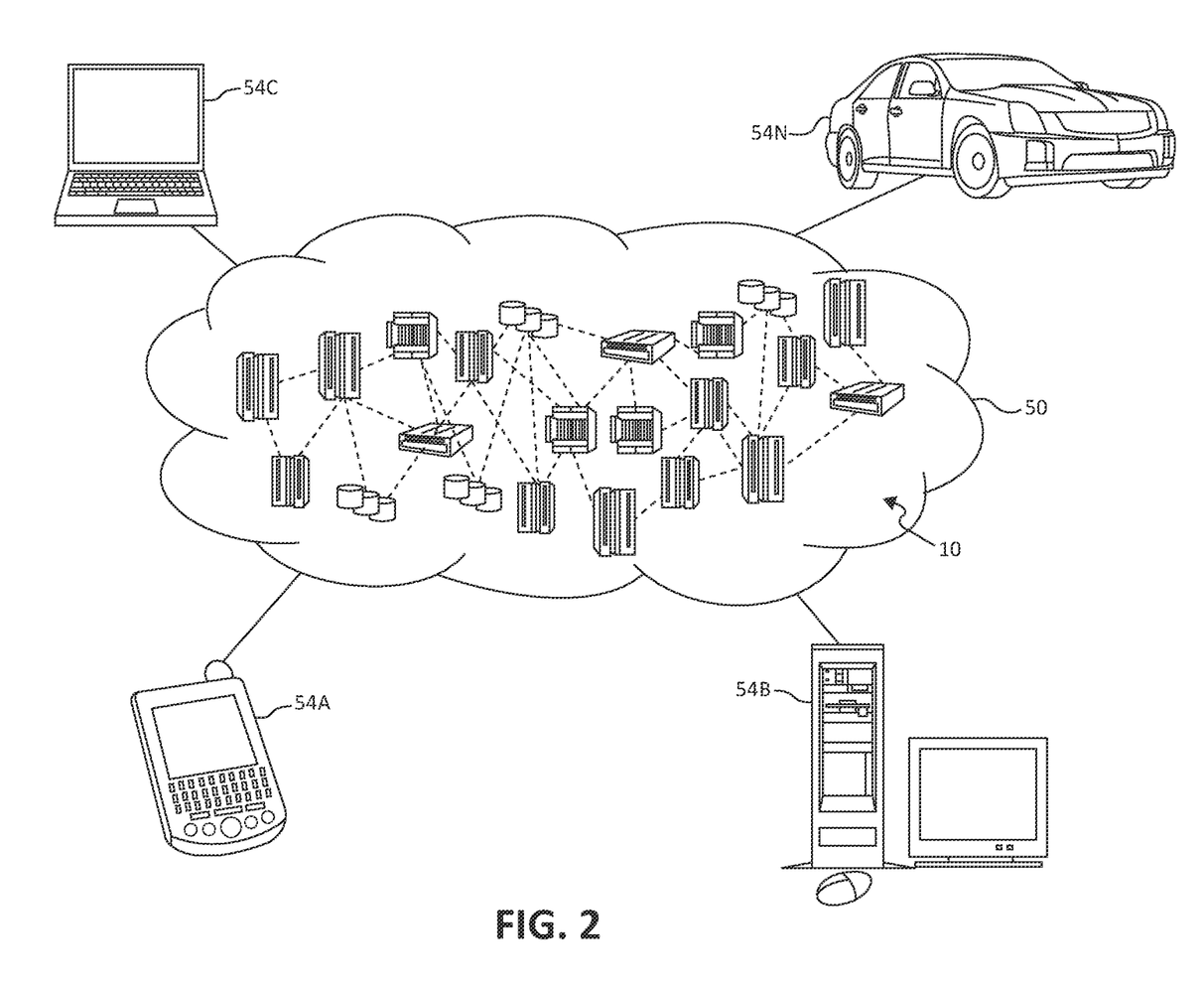
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
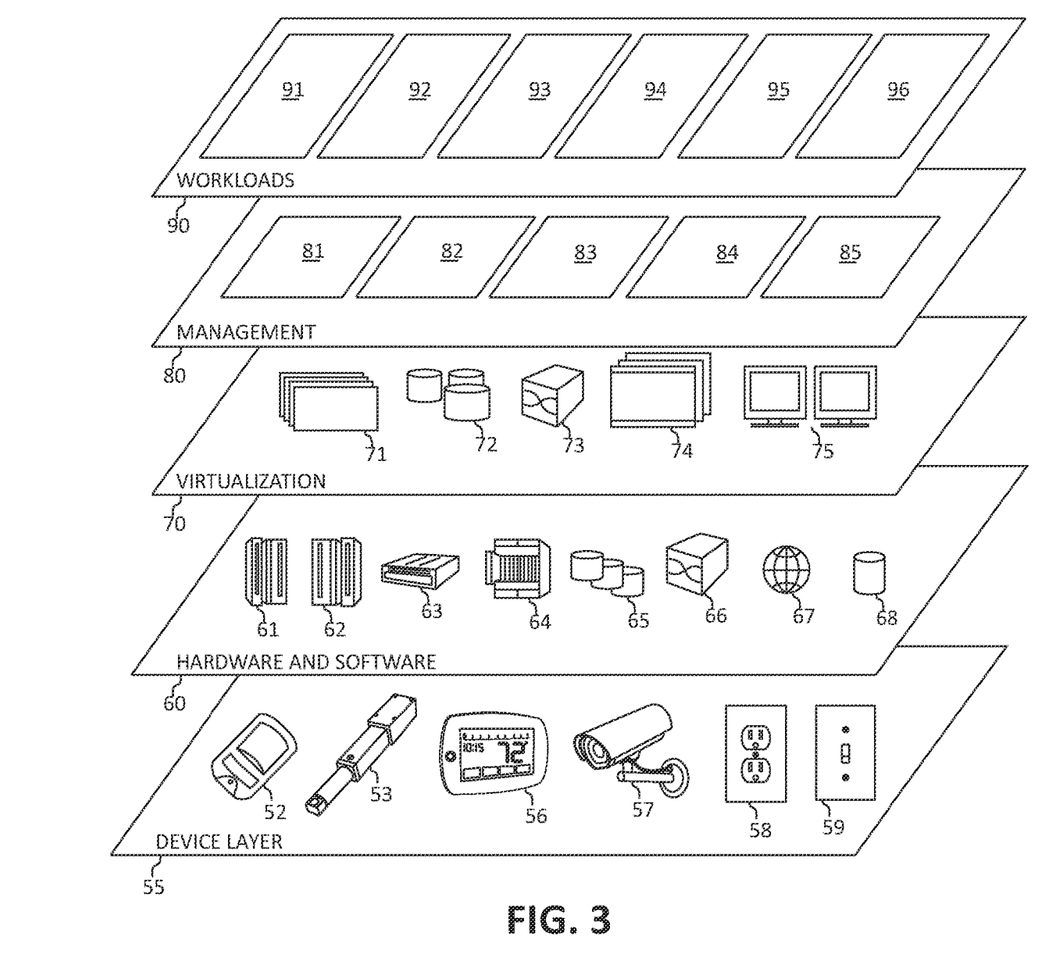
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing aaS platforms or systems, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided that, for example, provide robust, safe, and real-time operations when (as an example) connectivity issues arise in aaS settings (or environments, platforms, systems, etc.) (or perhaps more generally any situation in which remote or cloud computing is involved). In some embodiments, when connectivity issues arise, the methods and systems switch to utilizing one or more local models that have been generated based on input-output streams provided to and from the aaS platform (i.e., during times when there are no connectivity issues, the aaS platform is functioning properly, etc). In some embodiments, the model (or more than one model) is local to the particular user or device requesting the aaS functionality and is generated by the local resources (e.g., the device). However, in some embodiments, the aaS platform may be utilized to generate the model(s) (i.e., during times when there are no connectivity issues, etc.).

In some embodiments, the methods and systems described herein provide for the learning or generating of at least one local model (e.g., a CLS model and/or a CLAI model) based on the input-output streams that are sent to and received from an aaS platform. Connectivity issues (e.g., intermittency, latencies, denial-of-service attacks, etc.) are monitored for (or detected). If such a connectivity issue is detected, the method and/or system ceases the utilization of the aaS platform and switches to utilizing the local model(s) to provide the functionality provided by the aaS platform during times of no connectivity issues. In some embodiments, the local model(s) is evaluated, retrained, updated, etc. if deemed appropriate, which may be performed utilizing the aaS platform. Such evaluations may be performed periodically (e.g., once a day, once a week, etc.) and ensure that the performance, safety, etc. of local model(s) is optimized (e.g., as close to the aaS platform as possible).

As such, the methods and systems described herein may employ or utilize data collection (e.g., collection, monitoring, etc. of the input-output streams. Additionally, the methods and systems may utilize data-driven system identification and AI models (or a cognitive analysis, ML, etc.) to generate and adapt the local model(s) (e.g., a CLS model and/or a CLAI model). Further, transfer learning may be utilized to learn from other users' (and/or computing devices/systems) interaction of the same (or at least similar) aaS platform. The methods and systems may utilize data collection applications and local and remote resources (e.g., the resources of the local device and the resources of the aaS platform) for the generating (and/or updating) of the local model(s).

Figure 4:
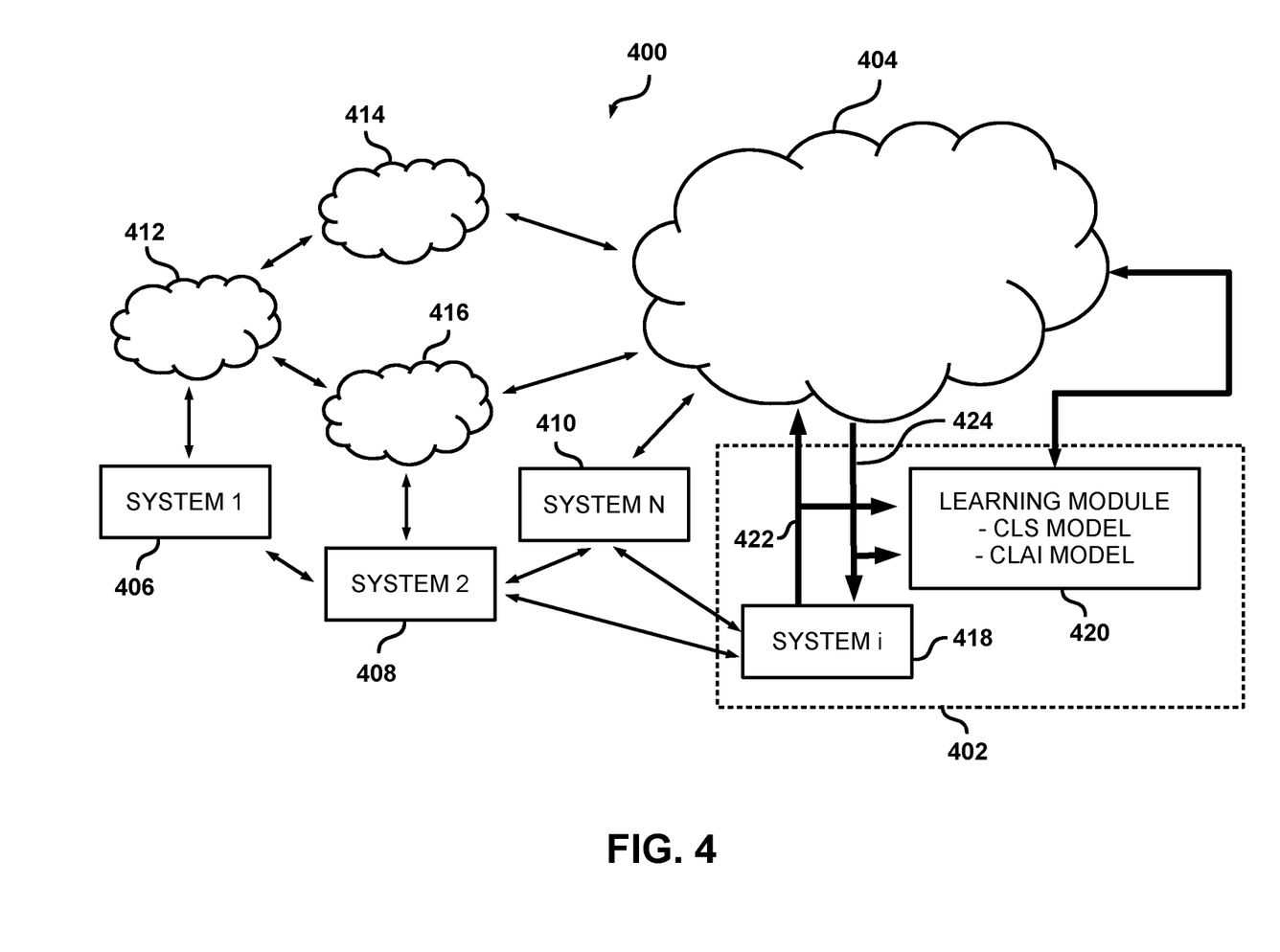
FIG. 4 is a block diagram of a computing environment during normal operation according to an embodiment of the present invention.

FIG. 4 illustrates an exemplary computing environment 400 according to some embodiments described herein. In particular, FIG. 4 illustrates a primary computing device (and/or primary user) 402 interacting with an aaS platform (or more generally a cloud platform) 404. More particularly, the environment 400 is shown in FIG. 4 during "normal" operation (i.e., during a time of no connectivity issues). In the depicted embodiments, the environment 400 also includes other (or secondary) computing devices (and/or other/secondary users) 406, 408, and 410 (i.e., system 1, system 2, and system N) interacting with the aaS platform 404 and/or other aaS (or cloud) platforms 412, 414, and 416. In some embodiments, the other computing devices 406-410 are separate from the primary computing device 402 (e.g., each computing device includes its own processor, etc.), but the various devices may be in operable communication via any suitable communications network.

The other aaS platforms 412-416 may be configured to perform the same or similar functionality as aaS platform 404 (or be copies thereof). As such, it should be understood that the embodiments described herein may be utilized in various types of cloud setting, such as single-cloud, multiple-cloud, and hybrid cloud settings.

Still referring to FIG. 4, the primary computing device 402 includes a core system 418 (i.e., system i) and a learning module 420. Although not shown in detail, the core system 418 may include a processor, memory, etc. and may send input 422 (and/or a signal representative thereof) to and receive output (and/or a signal representative thereof) 424 from the aaS platform 404. As will be appreciated by one skilled in the art, the input 422 provided by the core system 418 may be any input suitable to provide to the aaS platform (e.g., sensor data, input provided by an individual, etc.), and the output 424 may be any output suitably generated in response to the input 422. For example, the output 424 may be a decision associated with an action to be performed by the primary computing device 402.

As is shown in FIG. 4, the input 422 and the output 424 are provided to and/or monitored/collected by the learning module 420. The learning module 420 (and/or the core system 418) may include any suitable computing resources that are configured to perform at least some of the processes, functionality, etc. described herein, including ML techniques, cognitive analyzes, etc., including generating, adapting, learning, etc. one or more local model, as described above. In the example shown, the local models include a CLS model and a CLAI model. As described above, the CLS model may be generated based on the input 422 provided by the core system 418 to the aaS platform 404 and the output 424 received from the aaS platform 404. As such, the CLS model associated with or utilized by the primary computing device 402 may be generated based on the input-output streams associated with the interaction of the primary computing device 402 with the aaS platform 404. The CLAI model may be generated based on the input-outputs streams of the other computing devices 406-410 with the appropriate aaS platform (i.e., aaS platform 412, aaS platform 414, etc.). As such, the CLAI model associated with or utilized by the primary computing device 402 may be generated based on the input-output streams associated with other computing devices interacting with an aaS platform. Thus, as shown in FIG. 4, the core system of the primary computing device 402 may receive input-output data from the other computing devices 406-410 and/or the appropriate aaS platform(s) (if possible). As also shown in FIG. 4, the learning module 420 may send and receive data to and from the aaS platform 404 (i.e., the aaS platform may be utilized to generate/adapt the local models during normal operation).

Figure 5:
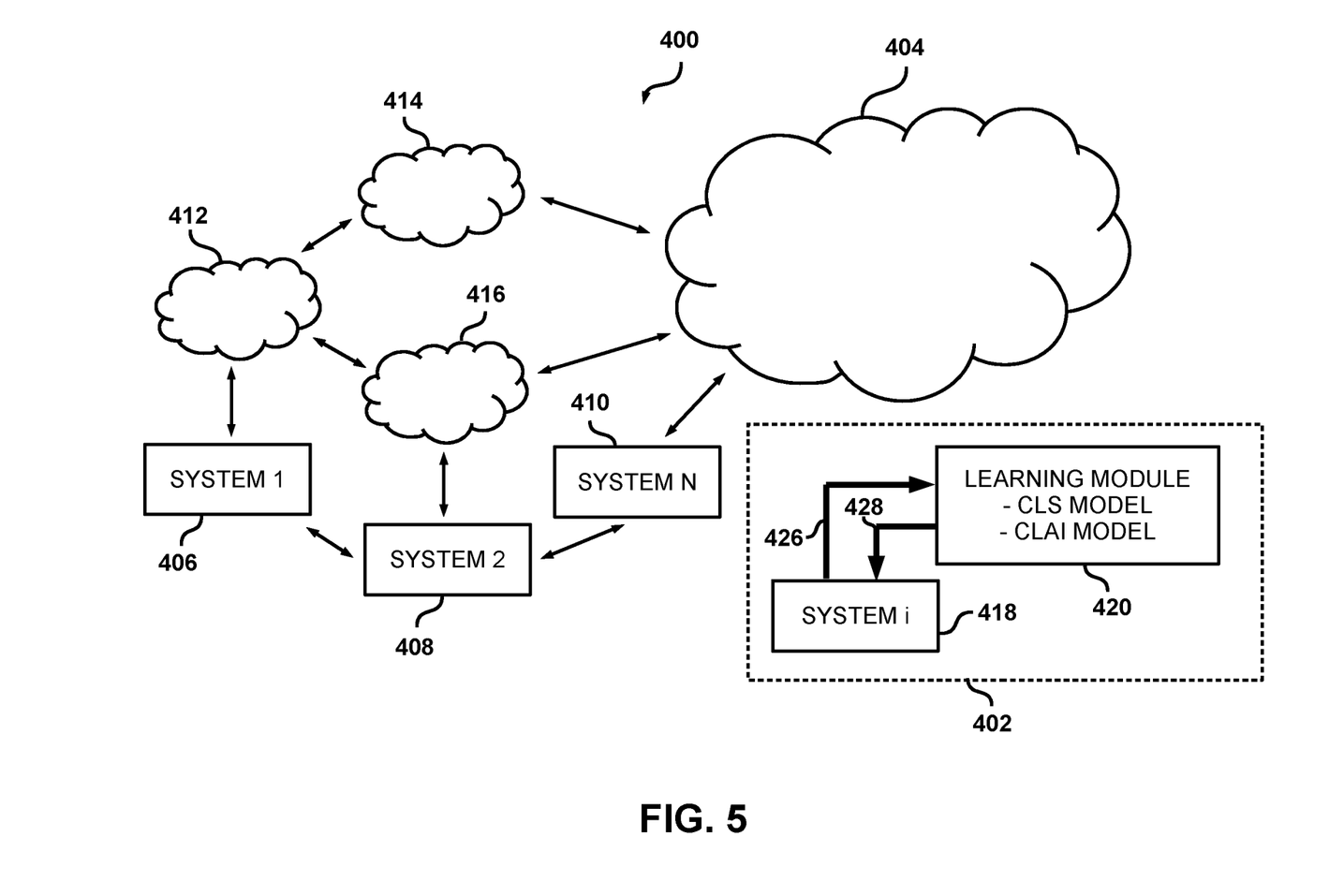
FIG. 5 is a block diagram of the computing environment of FIG. 4 during a connectivity issue associated with a cloud platform therein according to an embodiment of the present invention.

Referring now to FIG. 5, the computing environment 400 of FIG. 4 is shown during a connectivity issue. More particularly, as shown in FIG. 5, the primary computing system 402 may be unable to send and receive data to and from the aaS platform 404. When such occurs, the system (e.g., a processor, etc.) within the core system 418 of the primary computing device 418 switches to utilizing the local model(s) (e.g., the CLS model and/or the CLAI model), which are implemented locally (e.g., on the same device). As such, the primary computing device 402 is still able to function in a manner as if there was not a connectivity issue with the aaS platform 404. As shown, input, more particular subsequent input 426 (i.e., generated by the core system 418 after the input 422 utilized to generate the model(s)) may be provided to the learning module 420, which utilizes the local model(s) in an appropriate way, to generate (local) output 424 (e.g., a decision) and provide such to the core system 418. As described above, in some embodiments, the local model(s) may be updated periodically (e.g., utilizing the aaS platform 404 during times of no connectivity issues).

As such, in some embodiments, data that is sent and received by the users (or associated computing devices) is collected and/or monitored. The data is processed, and at least one local model is generated. Connectivity issues are monitored, and if such is detected, the system switches from utilizing the aaS platform to utilizing the local model(s). The local models are utilized to determine robust, safe, and real-time decisions. Data may be continuously collected and the quality of the local models may be monitored with respect to the aaS platform. In some embodiments, the CLAI model depends on other users (if the associated input-output data is available), thereby making the approach described herein capable of representing distributed decision making. In some embodiments, the CLS model is generated based on and has access to input data streams associated with the particular user (e.g., local) and may be an input-output model. However, the CLAI model may predict how the other users behave without input streams (since they may not be available locally).

As one example of an environment in which the methods and systems described herein may be utilized, consider an automated collection (or team) or robots that are tasked with winning a game of soccer and are, under normal conditions, controlled via an aaS platform. Data may be collected from all of the robots and/or sensors thereon, such as position, bearing, velocity, etc. The data may be sent to the cloud where a complex multi-objective optimal controller is utilized to determine the next action for the robots (or each robot) in real-time. During that time, the data is also collected locally and/or on the cloud to generate one or more local model, such as a CLS model and CLAI model, for each robot. The local models are stored/implemented locally on each robot. In the event of a connectivity issue with the aaS platform, each robot may switch to its local models, and based on the sensory inputs, utilize the local models to determine the best next action/decision. The local models may be continuously evaluated to optimize performance. Because of the local models, connectivity among robots and robots to cloud is not critical, and the system as a whole may still function appropriately during times of connectivity issues. A similar example may be the utilization of robots in haptic and/or remote control situations, such as robots in space or underwater, surgical robots, rescue robots, etc.

As another example, consider a system that includes a field of smart sensors and controllers that monitor a spatially-distributed system, such as an oil network with many pipes, switches, and so forth, and can act to maintain safe operating conditions (e.g., by reducing pressure within the pipes). Data may be collected from the sensors, such as concentration, velocity, pressure, etc. and sent to the cloud where a complex network and partial-differential-equation-constrained controller is utilized to compute the next controller actions for the smart sensors to keep the network under safe operating conditions in real-time. As above, the data is also collected locally and/or on the cloud to build at least one local model (e.g., a CLS model and CLAI model) for each sensors, with are stored locally on each sensor. If connectivity fails, each sensor can switch to its local model (s), and based on its sensory inputs alone determine its next action in a safe, robust, and real-time manner. The local models may be evaluated continuously to optimize their performance. Because of the local models, connectivity among the sensors and sensors to cloud is not critical, and the system as a whole may still function appropriately during times of connectivity issues.

Figure 6:
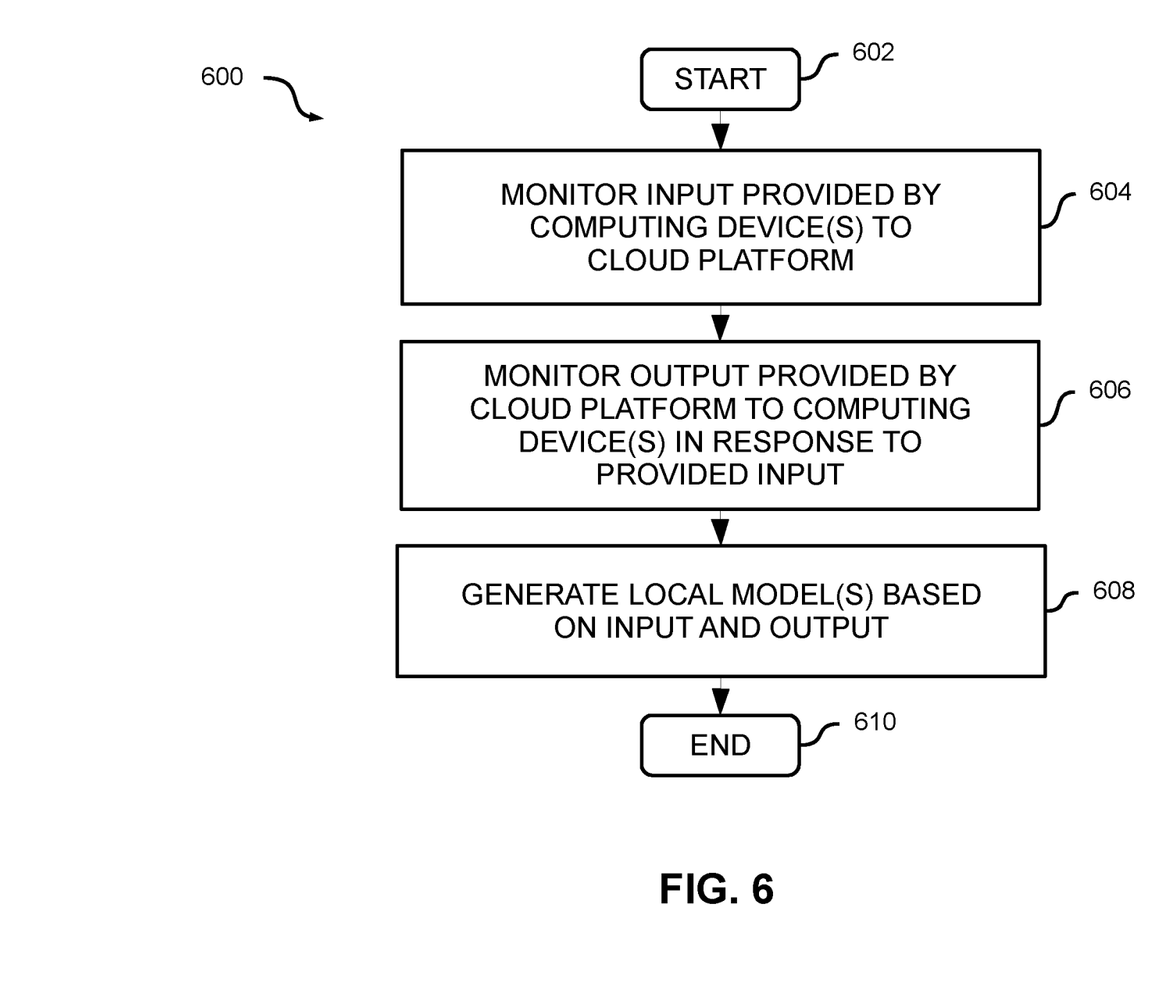
FIG. 6 is a flowchart diagram of an exemplary method for managing as-a-service (aaS) computing system according to an embodiment of the present invention.

Turning to FIG. 6, a flowchart diagram of an exemplary method 600 for managing an aaS (or more generally a cloud) computing system (or setting or environment) is provided. The method 600 begins (step 602) with, for example, one or more computing devices (perhaps associated with users/individuals) within an aaS setting being provided with ability to monitor and collect the input-output stream sent to and from a cloud platform (e.g., an aaS platform) and generate models, as described above.

Input provided by at least one computing device to a cloud platform is monitored (step 604). The cloud platform may include at least one of a single cloud platform, a multiple cloud platform, and a hybrid cloud platform. The at least one computing device may include a plurality of computing devices.

Output provided by the cloud platform to the at least one computing device in response to the input provided by the at least one computing device is monitored (step 606). Each of the output provided by the cloud platform and the local output generated based on the at least one local model may include at least one decision associated with an action to be performed by the at least one computing device.

At least one local model is generated based on the input provided to the cloud platform and the output provided to the at least one computing device (step 608). The at least one local model includes at least one of a surrogate model and an artificial intelligence (AI) model. The at least one local model may include a first local model and a second local model. The first local model may be local to a first of the plurality of computing devices and generated based on the input provided by the first of the plurality of computing devices to the cloud platform and the output provided by the cloud platform to the first of the plurality of computing devices. The second local model may be local to the first of the plurality of computing devices and generated based on the input provided by others of the plurality of computing devices to the cloud platform and the output provided by the cloud platform to the others of the plurality of computing devices.

A connectivity issue associated with the cloud platform may be detected. Subsequent input provided by the at least one computing device to the cloud platform may be monitored. Local output for the at least one computing device may be generated based on the subsequent input provided by the at least one computing device and the at least one local model. The generating of the local output for the at least one computing device may be computationally cheaper than said providing of the output by the cloud platform.

Method 600 ends (step 610) with, for example, the connectivity issue associated with the cloud platform ending and the system returning to normal operation (e.g., utilizing the aaS platform). In some embodiments, the local model(s) are periodically evaluated and, if deemed appropriate, updated, relearned, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing an as-a-service (aaS) computing system, by a processor, comprising:
monitoring input provided by at least one computing device to a cloud platform;
monitoring output provided by the cloud platform to the at least one computing device in response to the input provided by the at least one computing device, wherein the output includes a sequence of decisions, computed by the cloud platform based on the input, determining a series of actions the at least one computing device is instructed to iteratively perform; and
generating at least one local model based on the input provided to the cloud platform and the output provided to the at least one computing device, wherein at least one of the sequence of decisions determining at least one of the series of actions is computed by the at least one local model.

2. The method of claim 1, further comprising:
detecting a connectivity issue associated with the cloud platform;
monitoring subsequent input provided by the at least one computing device to the cloud platform; and
generating local output for the at least one computing device based on the subsequent input provided by the at least one computing device and the at least one local model.

3. The method of claim 2, wherein the generating of the local output for the at least one computing device is computationally cheaper than said providing of the output by the cloud platform.

4. The method of claim 1, wherein the at least one local model includes at least one of a surrogate model and an artificial intelligence (AI) model.

5. The method of claim 1, wherein the at least one computing device includes a plurality of computing devices, and the at least one local model includes a first local model and a second local model, wherein the first local model is local to a first of the plurality of computing devices and is generated based on the input provided by the first of the plurality of computing devices to the cloud platform and the output provided by the cloud platform to the first of the plurality of computing devices, and wherein the second local model is local to the first of the plurality of computing devices and is generated based on the input provided by others of the plurality of computing devices to the cloud platform and the output provided by the cloud platform to the others of the plurality of computing devices.

6. The method of claim 1, wherein the cloud platform includes at least one of a single cloud platform, a multiple cloud platform, and a hybrid cloud platform.

7. A system for managing an as-a-service (aaS) computing system comprising:
   a processor executing instructions stored in a memory device, wherein the processor:
   monitors input provided by at least one computing device to a cloud platform;
   monitors output provided by the cloud platform to the at least one computing device in response to the input provided by the at least one computing device, wherein the output includes a sequence of decisions, computed by the cloud platform based on the input, determining a series of actions the at least one computing device is instructed to iteratively perform; and
   generates at least one local model based on the input provided to the cloud platform and the output provided to the at least one computing device, wherein at least one of the sequence of decisions determining at least one of the series of actions is computed by the at least one local model.

8. The system of claim 7, wherein the process further:
   detects a connectivity issue associated with the cloud platform;
   monitors subsequent input provided by the at least one computing device to the cloud platform; and
   generates local output for the at least one computing device based on the subsequent input provided by the at least one computing device and the at least one local model.

9. The system of claim 8, wherein the generating of the local output for the at least one computing device is computationally cheaper than said providing of the output by the cloud platform.

10. The system of claim 7, wherein the at least one local model includes at least one of a surrogate model and an artificial intelligence (AI) model.

11. The system of claim 7, wherein the at least one computing device includes a plurality of computing devices, and the at least one local model includes a first local model and a second local model, wherein the first local model is local to a first of the plurality of computing devices and is generated based on the input provided by the first of the plurality of computing devices to the cloud platform and the output provided by the cloud platform to the first of the plurality of computing devices, and wherein the second local model is local to the first of the plurality of computing devices and is generated based on the input provided by others of the plurality of computing devices to the cloud platform and the output provided by the cloud platform to the others of the plurality of computing devices.

12. The system of claim 7, wherein the cloud platform includes at least one of a single cloud platform, a multiple cloud platform, and a hybrid cloud platform.

13. A computer program product for managing an as-a-service (aaS) computing system, by a processor, the computer program product embodied on a non-transitory computer-readable storage medium having computer-readable program code portions stored therein, the computer-readable program code portions comprising:
   an executable portion that monitors input provided by at least one computing device to a cloud platform;
   an executable portion that monitors output provided by the cloud platform to the at least one computing device in response to the input provided by the at least one computing device, wherein the output includes a sequence of decisions, computed by the cloud platform based on the input, determining a series of actions the at least one computing device is instructed to iteratively perform; and
   an executable portion that generates at least one local model based on the input provided to the cloud platform and the output provided to the at least one computing device, wherein at least one of the sequence of decisions determining at least one of the series of actions is computed by the at least one local model.

14. The computer program product of claim 13, wherein the computer-readable program code portions further include:
   an executable portion that detects a connectivity issue associated with the cloud platform;
   an executable portion that monitors subsequent input provided by the at least one computing device to the cloud platform; and
   an executable portion that generates local output for the at least one computing device based on the subsequent input provided by the at least one computing device and the at least one local model.

15. The computer program product of claim 14, wherein the generating of the local output for the at least one computing device is computationally cheaper than said providing of the output by the cloud platform.

16. The computer program product of claim 13, wherein the at least one local model includes at least one of a surrogate model and an artificial intelligence (AI) model.

17. The computer program product of claim 13, wherein the at least one computing device includes a plurality of computing devices, and the at least one local model includes a first local model and a second local model, wherein the first local model is local to a first of the plurality of computing devices and is generated based on the input provided by the first of the plurality of computing devices to the cloud platform and the output provided by the cloud platform to the first of the plurality of computing devices, and wherein the second local model is local to the first of the plurality of computing devices and is generated based on the input provided by others of the plurality of computing devices to the cloud platform and the output provided by the cloud platform to the others of the plurality of computing devices.

18. The computer program product of claim 13, wherein the cloud platform includes at least one of a single cloud platform, a multiple cloud platform, and a hybrid cloud platform.

* * * * *